United States Patent [19]
Füchsle et al.

[11] Patent Number: 5,796,060
[45] Date of Patent: Aug. 18, 1998

[54] GAS INSULATED SWITCHGEAR WITH GROUNDING AND DISCONNECTING SWITCHES

[75] Inventors: Dieter Füchsle, Lengnau; Peter Högg, Wettingen; Lothar Mantel, Otelfingen; Georg Schett, Winterthur, all of Switzerland

[73] Assignee: Asea Brown Boveri AG, Baden, Switzerland

[21] Appl. No.: 596,746

[22] Filed: Feb. 5, 1996

[30] Foreign Application Priority Data

Mar. 28, 1995 [DE] Germany ............ 195 11 168.0

[51] Int. Cl.⁶ .......................... H01H 33/59; H02B 5/06; H02B 13/035
[52] U.S. Cl. .................. 218/79; 218/80; 361/604; 361/612; 361/618
[58] Field of Search ............... 218/43–88, 79, 218/80, 68; 361/600–618, 65, 93, 115

[56] References Cited

U.S. PATENT DOCUMENTS

| | | | |
|---|---|---|---|
| 3,857,006 | 12/1974 | Daimon et al. | 218/84 |
| 4,241,379 | 12/1980 | Olsen | 218/55 X |
| 4,434,335 | 2/1984 | Natsui et al. | 218/83 |
| 4,527,220 | 7/1985 | Boersma et al. | 218/82 |
| 4,897,027 | 1/1990 | Szaplonczay et al. | 425/117 |
| 5,484,972 | 1/1996 | Tecchio | 218/70 |

FOREIGN PATENT DOCUMENTS

| | | | |
|---|---|---|---|
| 951019 | 4/1956 | Germany . | |
| 1665255 | 1/1971 | Germany | H02B 13/02 |
| 2809851 | 11/1978 | Germany | H02B 13/02 |
| 3318344A1 | 12/1983 | Germany | H02B 13/02 |
| 2754691C2 | 8/1984 | Germany | H02B 13/02 |
| 3421265A1 | 12/1984 | Germany | H02B 13/035 |
| 3616621A1 | 11/1986 | Germany | H01B 3/46 |
| 4336951A1 | 5/1995 | Germany | H02B 5/06 |

Primary Examiner—J. R. Scott
Attorney, Agent, or Firm—Burns, Doane, Swecker & Mathis, L.L.P.

[57] ABSTRACT

A switching apparatus includes a grounded, insulating gas-filled housing, the housing having a housing wall, and a power circuit-breaker disposed in the housing. The apparatus further includes a current connection for a first busbar, a current connection for a second busbar, and a current connection for a load outgoer. The apparatus further includes a grounding switch disposed in the housing, the grounding switch being connected between the power circuit-breaker and the current connection for the load outgoer, and a busbar disconnector, the busbar disconnector being connected between the current connection of the first busbar and the power circuit-breaker and between the current connection of the second busbar and the power circuit-breaker. An outwardly extended, first tubular flange arrangement is attached over a first opening in the housing wall, and an outwardly extended, second tubular flange arrangement is attached over a second opening in the housing wall. A first outdoor bushing is provided, the first outdoor bushing being fastened to the first tubular flange attachment, the current connection for the first busbar extending through the first outdoor bushing. A second outdoor bushing is provided, the second outdoor bushing being fastened to the second tubular flange attachment, the current connection for the second busbar extending through the second outdoor bushing. The busbar disconnector is movable between at least three positions, the busbar disconnector having a first and a second fixed contact and a movable contact arrangement, the movable contact arrangement interacting with the first and second fixed contacts and being electrically conductively connected to the power circuit-breaker, the first fixed contact defining an end of the current connection of the first busbar and being disposed in the housing, and the second fixed contact defining an end of the current connection of the second busbar and being disposed in the housing.

24 Claims, 5 Drawing Sheets

GAS INSULATED SWITCHGEAR WITH GROUNDING AND DISCONNECTING SWITCHES

BACKGROUND OF THE INVENTION

1. Field of the Invention

The invention is based on a switching apparatus. This switching apparatus has a grounded, insulating gas-filled metal housing which accommodates a power circuit-breaker and a grounding switch. Passed through the wall of the metal housing are at least one current connection to at least one busbar and a current connection to a load outgoer, for instance to a line or to a cable. Such a switching apparatus has smaller dimensions than an outdoor switching apparatus having a corresponding action, since the breakdown strength is increased in comparison with air due to the insulating gas filling of the metal housing.

2. Discussion of Background

The invention refers to a prior art of switching apparatuses such as is disclosed in DE-C 951 019 and DE 27 54 691 C2.

The switching apparatus described in DE-C 951 019 has a housing which is filled with an insulating gas having a higher breakdown strength than air and contains switches, such as power circuit-breakers, output disconnecting switches, measurement transducers and bushings. Furthermore, all of the devices for actuating the switches and all of the fuses and monitoring devices are also accommodated in the housing, with the result that the switching apparatus constitutes a switching unit which is ready for operation and needs to be connected at the place of use only to the busbars and to the control lines. The busbars and the associated busbar disconnectors are arranged in a further insulating gas-filled housing. In order to connect the switching apparatus, therefore, a duct connector is required which is likewise filled with insulating gas and is fitted between the switching apparatus and the busbar housing.

The switching apparatus described in DE 27 54 691 C1 is part of a metal-enclosed, compressed gas-insulated high-voltage switching installation and has a pressure vessel which is filled with $SF_6$ at a pressure of two or more bar, in which current transformers and maintenance grounding switches are also arranged in addition to the power circuit-breaker and in which it is possible to produce various mutual interconnections between these devices by means of panel-specific current-carrying parts. The pressure vessel is connected in a positively locking manner to two further $SF_6$-filled pressure vessels, one of which contains all of the devices and current-carrying parts required on the connection side, such as disconnecting switches, cable or overhead line connection elements and grounding switches, and the other contains all of the switchgear and current-carrying parts associated with the busbar. High operational availability is achieved, with a minimum number of pressure vessels, by such a switching device in a gas-insulated high-voltage switching installation in which the busbar section and the outgoer section are each accommodated in separate compressed-gas vessels.

A high-voltage power circuit-breaker described in DE 33 18 344 A1 has a switching unit which is arranged in a grounded, insulating gas-filled metal housing and the two current connections of which are passed through the wall of the metal housing to overhead lines. Two isolation points are disposed on the current connections and they can be actuated by the fitter once the insulating gas has been drawn off and the metal housing has been opened, and they serve to disconnect and connect the current connections during the disassembly and assembly of the switching unit. This circuit-breaker and all of the further elements of the switching installation are assembled component by component during the production of a switching installation.

SUMMARY OF THE INVENTION

Accordingly, one object of the invention is to provide a novel switching apparatus of the type mentioned in the introduction which is distinguished by a more compact design and greater availability than an outdoor switching apparatus having a comparable action, and by means of which it is possible at the same time to form a multiplicity of switching configurations between one or more busbars situated outdoors and a load outgoer, for instance a cable or an overhead line.

The switching apparatus according to the invention is distinguished by the fact that the majority of all the switchgear required in a high-voltage switching installation, such as power circuit-breakers, busbar disconnectors and grounding switches, are accommodated in a single partitionless gas compartment of a predominantly tubular metal housing. Such a switching apparatus can be prefabricated and tested as a complete, self-contained module in the factory. A high-voltage switching installation can then be completed on site in an extremely rapid and simple manner by connecting a current connection, which is passed out of the switching apparatus via an outdoor bushing, to the busbar(s) and a further current connection, which is passed out of the switching apparatus, to a cable or an overhead line. It is of particular advantage here that the switchgear of the high-voltage installation are now no longer exposed to the direct influence of the weather and therefore have a high degree of availability even after long periods of time during which no switching is carried out. At the same time, it is now no longer necessary to have a plurality of foundations, assigned to the individual component parts, for all of the essential component parts of the installation, rather a single foundation which supports the switching apparatus generally suffices.

Since the switching apparatus has small insulation clearances owing to the insulating gas provided inside its metal housing, it is designed to be small and space-saving and can be fitted without any problem into any already existing outdoor switching installation as a replacement for a plurality of switching devices provided in one or more branches of one or more busbars. Owing to the small spatial dimensions, the switching apparatus according to the invention can be fitted without any problems into all conventional switching installation layouts.

The switching apparatus according to the invention is particularly advantageously suitable for retrofitting already existing outdoor switching installations having small dimensions. By fitting the switching apparatus according to the invention, such installations can be expanded to a higher voltage level in a particularly simple and cost-effective manner.

If required, additional switchgear, such as outgoer disconnectors or further grounding switches, and/or sensors, such as, in particular, capacitively or optically acting voltage sensors and current sensors designed as a Rogovski coil or optically acting current sensors, and/or a current and voltage sensor combining both sensors can easily be provided in the switching apparatus. Since such sensors are designed in an extremely space-saving manner, in contrast to conventional current and/or voltage transformers, the switching installation according to the invention can easily be retrofitted with additional current and/or voltage sensors, which then enable, for example, the voltage measurement which is required for synchronized and controlled switching-on operations to be carried out on both sides of the switch.

The metal housing expediently has a housing of defined dimensions for every voltage class. In this case, it is recommended to select the dimensions such that the metal housing can accommodate not only the power circuit-breaker, busbar disconnector and grounding switch but also the outgoer disconnector and sensors. Depending on the requirement, the metal housing can then contain all of these components or alternatively only, some of these components. If the switching apparatus according to the invention is used, for example, to retrofit an outdoor switching installation which still contains functional current and/or voltage transformers and outgoer disconnector, then it is sufficient if the metal housing includes the power circuit-breaker, busbar disconnector and grounding switch, and if, during fitting into the high-voltage switching installation, the current and voltage transformers which are still present are attached to the bushings and the outgoer disconnector which is still present is connected to the outgoer of the switching apparatus.

Given an appropriate design, the switching apparatus can be fitted both into single-busbar installations and into double-busbar installations. A particularly space-saving arrangement is achieved when, in the event of using the switching apparatus according to the invention in a switching installation having a double busbar, the busbar disconnector is designed as a multi-position disconnector and can switch from one busbar to the other busbar without any interruption. Instead of two outdoor bushings, such as are provided in switching apparatuses according to the invention for double-busbar installations, it is possible, in the case of switching apparatuses for single-busbar installations, to remove one of the two outdoor bushings and to close off the flange attachment, which is present on the metal housing and serves to retain the outdoor bushing, by a grounded metal cover, a fixed contact, which acts as a grounding contact, of the busbar disconnector being fastened on that side of said cover which faces the interior of the housing.

Given a corresponding configuration, the switching apparatus according to the invention can be designed to be encapsulated both in a single-phase and a multi-phase manner.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
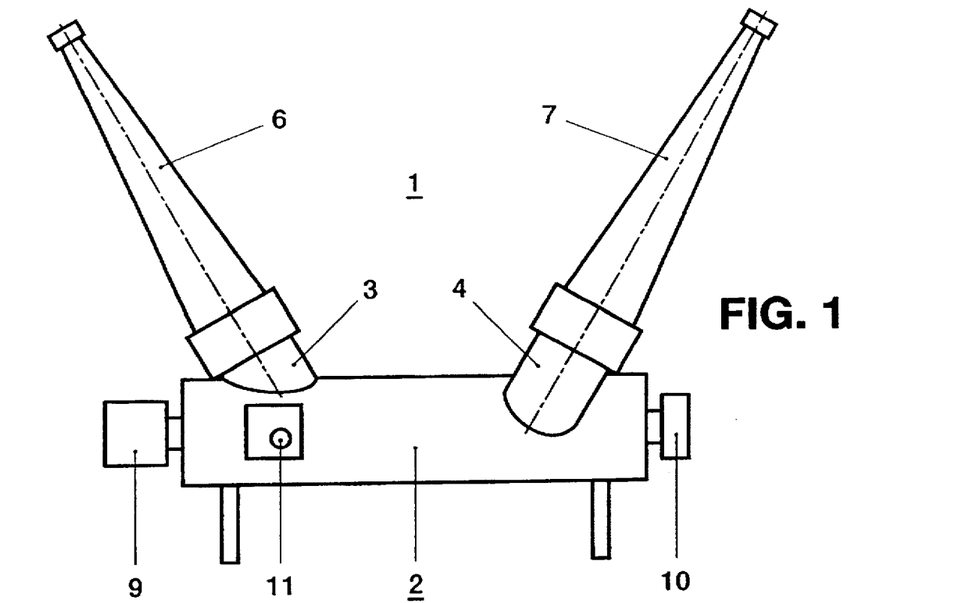
FIG. 1 shows a side view of a first embodiment of the switching apparatus according to the invention with an essentially tubular housing.
Figure 2:
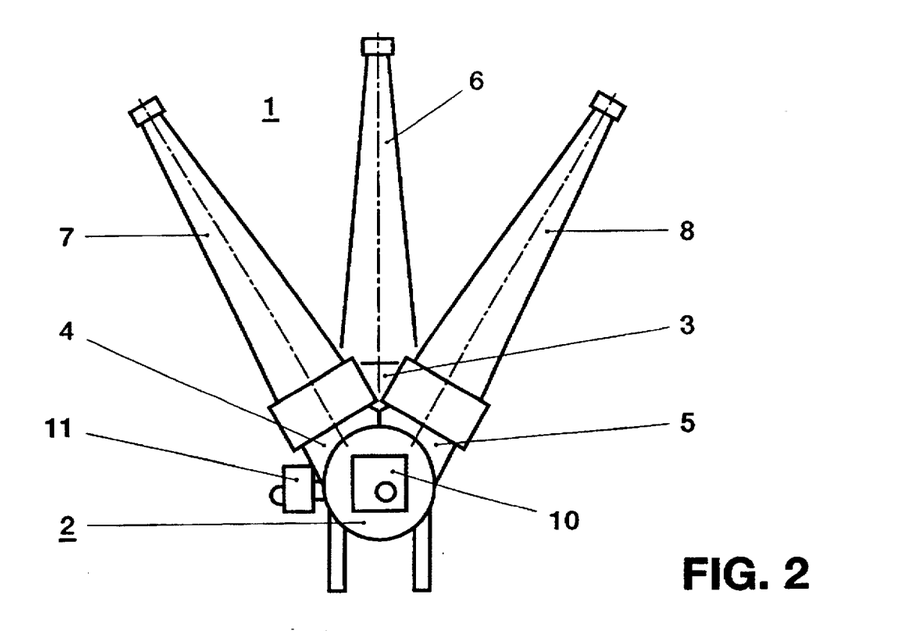
FIG. 2 shows a view of the switching apparatus according to FIG. 1 from the right in the direction of the tube axis.

Referring now to the drawings, wherein like reference numerals designate identical or corresponding parts throughout the several views, the switching apparatus illustrated in FIGS. 1 and 2 and identified by the designation 1 has a metal housing 2 which is filled with insulating gas, such as $SF_6$ at a pressure of a few bar, for instance, and is of essentially tubular design. The metal housing 2 is mounted on a frame (not designated) and is at ground potential. On its curved surface, the metal housing has three openings (not visible) which are respectively bounded by one of three tubular flange attachments 3, 4 and 5. One of three outdoor bushings 6, 7 and 8 is respectively held on those ends of the flange attachments which are remote from the metal housing 2. Each of these outdoor bushings preferably has a fiber-reinforced plastic housing with silicone shielding. By this arrangement, not only does the switching apparatus become considerably lighter, with improved transportability as a result, in comparison with an apparatus which is equipped with porcelain insulators, but also, at the same time, the risk of an explosion of the bushings, for instance on account of assembly or maintenance work in the installation or during the action of cantilever forces, is virtually eliminated. The axes of the flange attachments 3, 4 and 5 are typically at an angle of approximately 50° with respect to the tube axis of the metal housing 2. The flange attachments 4 and 5 are inclined relative to one another by an angle typically of 80° to 100°. The angled arrangement of the flange attachments means that it is possible to realize the required dielectric strength in air with minimum housing dimensions.

At its two ends, the metal housing 2 has two further openings (likewise not visible). A drive 9 for a power circuit-breaker situated inside the metal housing is passed through one opening and a drive 10 for a busbar disconnector likewise situated inside the housing is passed through the other opening, in both cases in a gastight manner. On its curved surface, the metal housing 2 has a further opening (not visible), through which a drive 11 for a grounding switch situated in the metal housing 2 is passed in a gastight manner.

Figure 3:
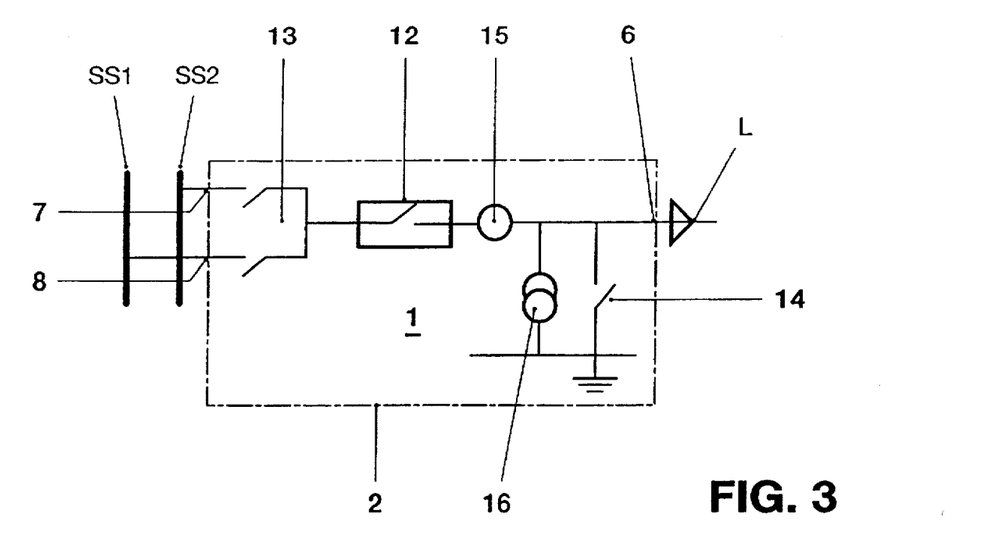
FIG. 3 shows a basic circuit diagram of the switching apparatus according to FIG. 1.

It is evident from FIG. 3 that the metal housing 2 of the switching apparatus accommodates a power circuit-breaker 12, one current connection of which circuit-breaker 12 is connected to a busbar SS1 or SS2 of a high-voltage switching installation via a busbar disconnector 13, which is designed as a multi-position disconnector, and one of the two outdoor bushings 7 or 8, and the other current connection of which circuit-breaker 12 is connected via the outdoor bushing 6 to a load outgoer, for instance a cable or a line L of the high-voltage switching installation. The metal housing 3 furthermore accommodates a grounding switch 14, which is connected between the outgoer-side current connection of the power circuit-breaker 12 and the grounded metal housing 2, as well as sensors, such as a current sensor 15 and a voltage sensor 16, which detect the current and the voltage at the load-side current connection of the power circuit-breaker 12. The sensors 15, 16 are designed in a space-saving manner. The current sensor 15 can be designed as a Rogovski coil or optical sensor, and the voltage sensor 16 can be designed as a capacitive voltage divider or optical sensor. As an alternative, the two sensors can be combined in a single sensor.

Figure 4:
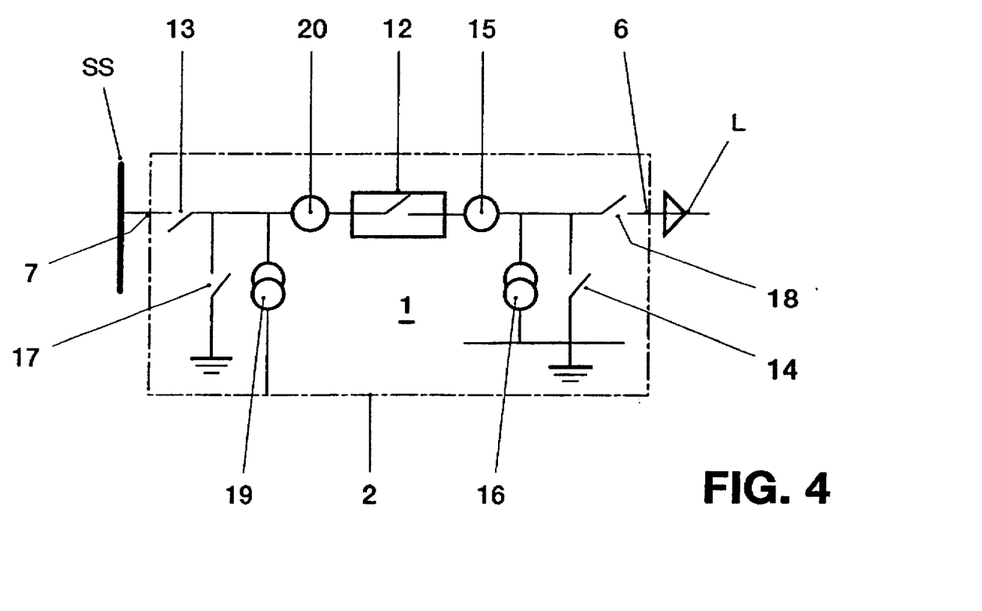
FIG. 4 shows a basic circuit diagram of a second embodiment of the switching apparatus according to the invention.

As illustrated in FIG. 4, it is possible, as an alternative, to omit the outdoor bushing 8 and connect the power circuit-breaker 12 to only one busbar SS of the high-voltage switching installation via a busbar disconnector 13, which is designed as a two-position disconnector, and the outdoor bushing 7. In addition, it is also possible to provide a grounding switch 17, which is connected between the busbar-side current connection of the power circuit-breaker 12 and the grounded metal housing 2, and/or an outgoer disconnector 18, which is connected between the outgoer-side current connection of the power circuit-breaker and the current conductor of the outdoor bushing 6, and/or a further voltage sensor 19 and a further current sensor 20. The sensors 19, 20 detect current and voltage at the busbar-side current connection of the power circuit-breaker 12. Together with the sensors 15, 16, it is thus possible to determine differential currents and/or voltages across the power circuit-breaker 12, thereby enabling potentially desirable synchronous switching of the power circuit-breaker.

By accommodating voltage and current sensors and further sensors, for instance for measuring pressure, density or temperature or partial discharges, in a single housing, the number of housing bushings is reduced and, at the same time, the paths required for transmitting the information determined by the sensors can be kept short. Moreover, by virtue of the compact design, all of the connections which are required for the control and regulation of the switchgear of the switching apparatus 1 and are used for the exchange of information between the sensors and the switchgear are also short and accommodated centrally at one place. In order to perform its control functionality, it is therefore only necessary to connect the switching apparatus 1 in a simple manner, via a single bus, to a control cabinet which performs control tasks.

Figure 5:
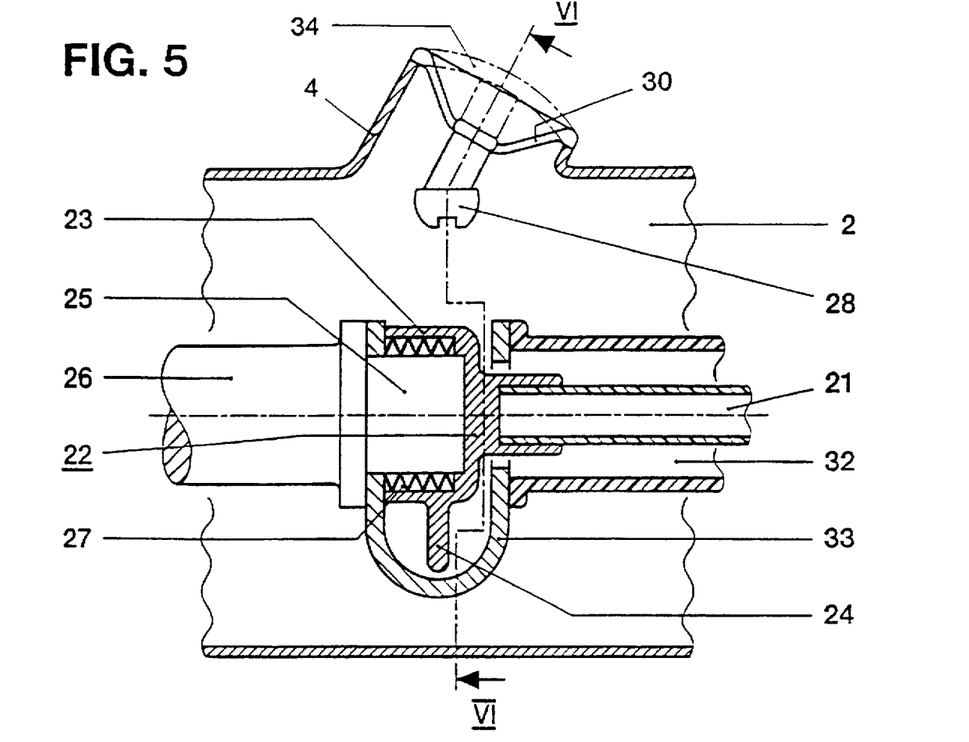
FIG. 5 shows a plan view of a section (taken along the tube axis) through a segment of the switching apparatus according to FIG. 1.
Figure 6:
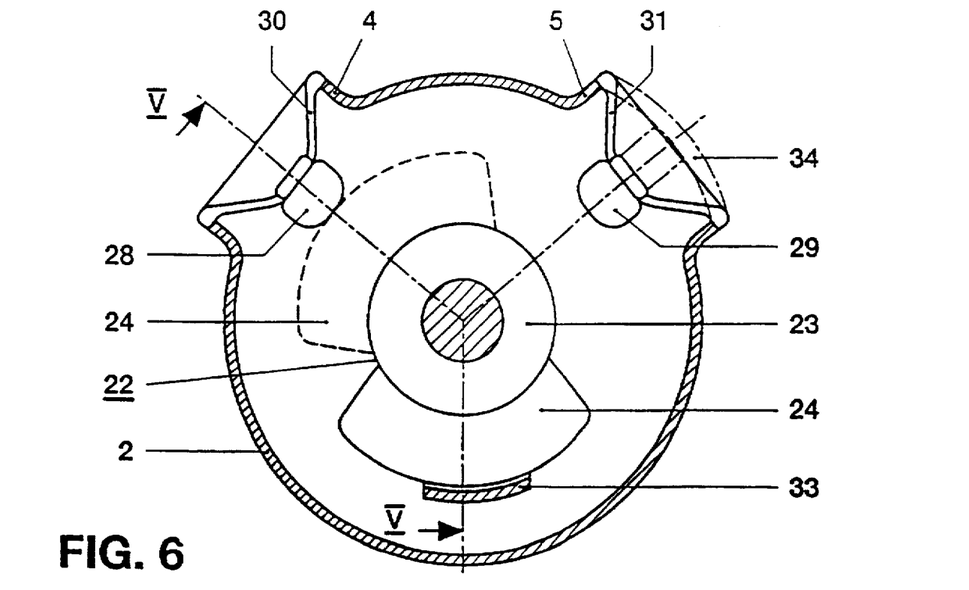
FIG. 6 shows a plan view of a section (taken along VI—VI) through the switching apparatus according to FIG. 5.

Part of the structural design of the switching apparatus according to FIG. 1 is indicated in FIGS. 5 and 6. These Figures illustrate sections through the metal housing 2 of the switching apparatus 1 in the region of the two flange attachments 4 and 5 after removal of the two outdoor bushings 7 and 8. The section illustrated in FIG. 5 is taken along the axis of the tubular metal housing 2, whereas the section illustrated in FIG. 6 is taken essentially transversely with respect to the axis.

In the two FIGS. 5 and 6, 21 designates a shaft, which is passed out of the metal housing 2 in a gastight manner and consists of insulating material, of the drive 10 (which is visible in FIGS. 1 and 2) of the busbar disconnector 13. A movable contact arrangement 22 of the busbar disconnector 13 is fastened to that end of the shaft 21 which is passed into the metal housing 2. The movable contact arrangement 22 is constructed from a bearing bush 23 and a segment 24 of contact material which is attached to the bearing bush, extends radially outward and is in the shape of a sector of a circle. The bearing bush 23 is supported rotatably on a cylindrically designed end segment 25 of a fixed current connection 26 (arranged on the busbar side) of the power circuit-breaker 12. Arranged between the curved surface of the end segment 25 and the inner surface of the bearing bush 23 is a sliding contact 27 which is used for the current transfer from the busbar disconnector 13 to the power circuit-breaker 12. The designations 28 and 29 designate fixed contacts of the busbar disconnector 13 which are held by supporting insulators 30 and 31 in the region of the flange attachments 4 and 5. During the assembly of the outdoor bushings 7 and 8, these contacts are connected to the current conductor of the outdoor bushings and are then used for the current connection of the switching apparatus 1 to the busbars SS1 and SS2. The supporting insulators 30 and 31 can be designed as partitioning insulators which seal the interior of the metal housing 2 from the outside in a gastight manner. However, they are preferably designed as gas-permeable supporting insulators. Insulating gas from the interior of the metal housing then forms, with the interior of the outdoor bushings 7 and 8 which are designed to be gastight, a total volume which is at the same pressure level.

A supporting insulator 32 which is fastened on the end of the metal housing 2 concentrically surrounds the shaft 21 and carries, at its end remote from the metal housing 2, a holding part 33 which engages behind the movable contact arrangement 22, is in the form of a clip and on which the busbar-side current connection 26 of the power circuit-breaker 12 is supported. As an alternative, the current connection 26 of the power circuit-breaker 12 can also be supported on an insulator mounted on the inner curved surface of the metal housing 2. The shaft 21 can then be passed into the interior of the housing via an opening provided on the curved surface of the metal housing 2.

The movable contact arrangement of the busbar disconnector 13 can assume four preferred positions:

In a first position (illustrated by dashed lines in FIG. 6), the segment 24 is in contact with the fixed contact 28 and has thus connected the busbar SS1 to the busbar-side current connection of the power circuit-breaker 12. With a closed power circuit-breaker 12, the busbar SS1 now feeds the load outgoer L.

With an open power circuit-breaker 12, a second position (not illustrated in FIG. 6) can be obtained by rotation of the shaft 21 in the clockwise direction. The segment 24, which is shaped as a sufficiently large sector of a circle, can additionally make contact with the fixed contact 29 without the electrically conductive connection between the busbar SS1 and the movable contact arrangement 22 being interrupted. The two busbars SS1 and SS2 are then connected to one another via the busbar disconnector 13.

With an open power circuit-breaker 12, it is possible to achieve a third position (likewise not illustrated in FIG. 6) by further rotation of the shaft 21 in the clockwise direction. During the transition from the second to the third position, the fixed contact 28 and the movable contact arrangement 22 are separated from one another and only the fixed contact 29 and hence the busbar SS2 are now connected to the busbar-side current connection 26 of the power circuit-breaker 12. With a closed power circuit-breaker 12, the busbar SS2 is now connected to the load outgoer With an open power circuit-breaker 12, the fourth position illustrated by solid lines in FIG. 6 is achieved by further rotation of the shaft 21 in the clockwise direction, in which fourth position the two contacts 29 and 22 are now separated from one another as well. The segment 24 (which is in the shape of a sector of a circle) of the movable contact arrangement 22 is now brought into the holding part 33 in the form of a clip and is then in contact neither with the fixed contact 28 nor with the fixed contact 29. In this position, any electrical charges which may possibly be present in the power circuit-breaker 12 or in control capacitors of the power circuit-breaker 12 can be removed by grounding (for example by means of a grounding switch which is arranged in a manner corresponding to the grounding switch 17 according to FIG. 4).

Instead of the outdoor bushing 8, the flange attachment 5 can carry a metal cover 34 which is illustrated by dashed lines in FIG. 6, the fixed contact 29, which now acts as a grounding contact, of the busbar disconnector 13 being fastened on that side of said cover which faces the interior of the housing. In the second position, the busbar disconnector 13 then grounds the busbar SS1 and, at the same time, the busbar-side current connection 26 of the power circuit-breaker 12. In the third position, it grounds only the current connection 26 of the power circuit-breaker.

Figure 7:
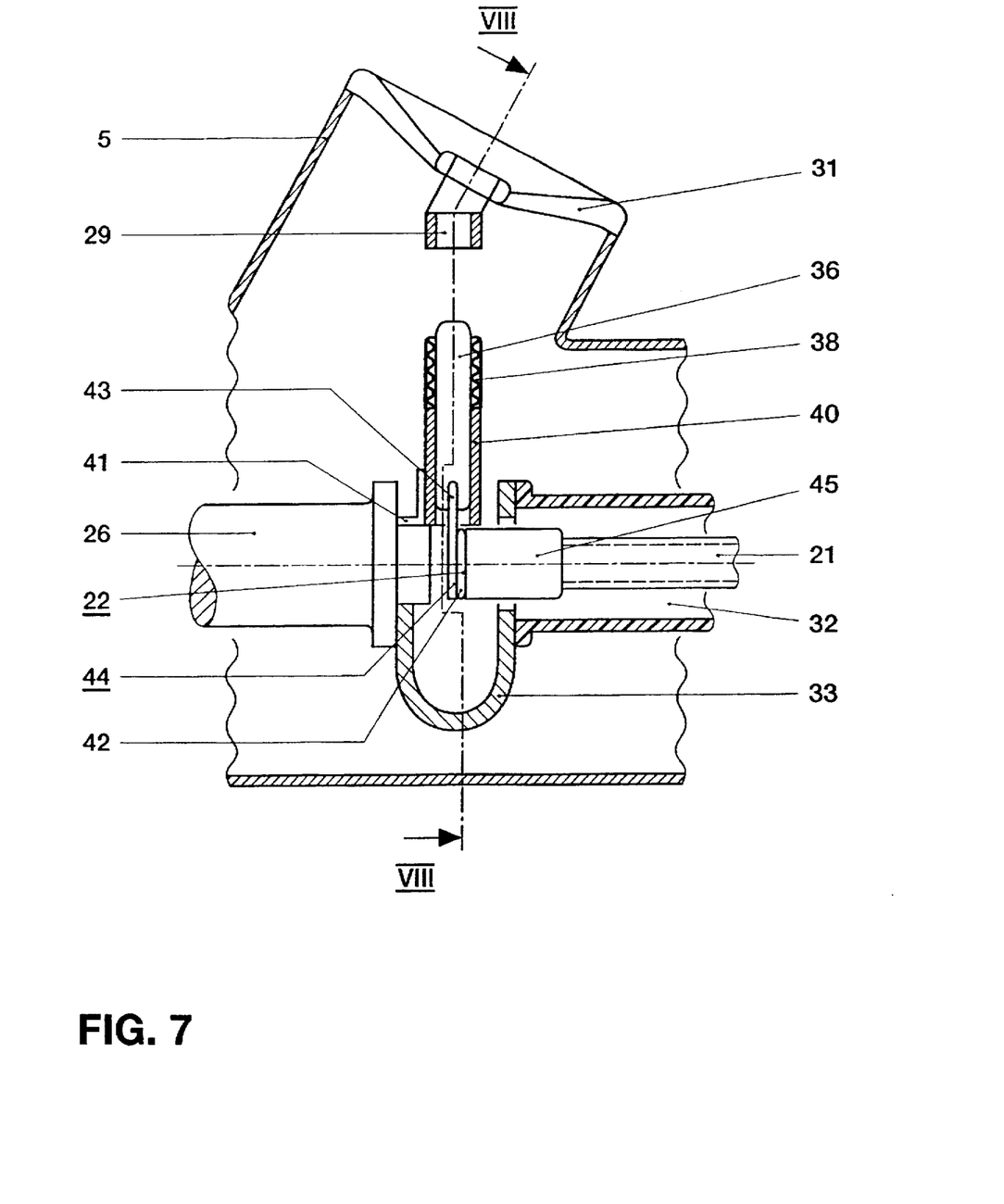
FIG. 7 shows a plan view of a section (taken along the tube axis) through a segment of a modified embodiment of the switching apparatus according to FIG. 1.
Figure 8:
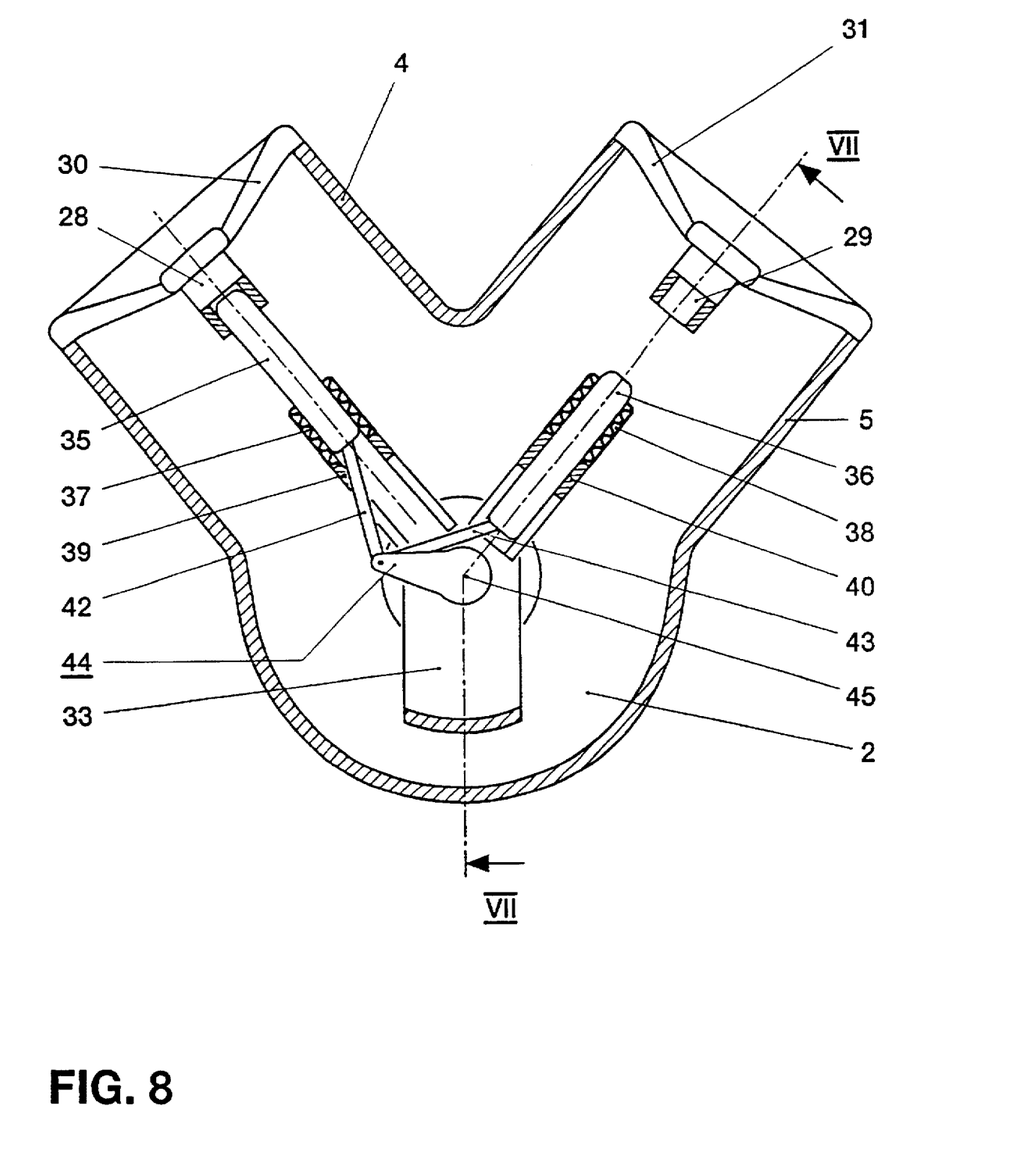
FIG. 8 shows a plan view of a section (taken along VIII—VIII) through the switching apparatus according to FIG. 7.

FIGS. 7 and 8 illustrate a busbar disconnector 13 which has been modified in comparison with the busbar disconnector illustrated in FIGS. 5 and 6. In contrast to the busbar disconnector 13 according to FIGS. 5 and 6, the movable contact part 22 of this busbar disconnector does not have a rotatable segment 24 made of contact material and in the shape of a sector of a circle, but rather a contact part 35, which is displaceably guided essentially in the direction of the axis of the tubular flange attachment 4, as well as a contact part 36, which is displaceably guided essentially in the direction of the axis of the tubular flange attachment 5. Each of the two contact parts 35 and 36, respectively, is guided in a metal sleeve 39, 40 which is at the potential of the busbar-side current connection 26 of the power circuit-breaker 12 and encloses at least one sliding contact 37 and 38, respectively. The two metal sleeves 39 and 40 are fastened, by means of a metal connecting part 41 of L-shaped profile, to the busbar-side current connection 26 of the power circuit-breaker 12 in such a way that they are at the same potential as the current connection 26, and that their sleeve axes respectively lie on one of the two axes of the flange attachments 4 and 5. A respective coupling rod 42, 43 of a driving mechanism 44 is articulated to those ends of the contact parts 35, 36 which are remote from the fixed contacts 28, 29. Those ends of the coupling rods 42 and 43 which are remote from the contact parts 35 and 36, respectively, are articulated to a crank arm 45 of the driving mechanism 44, which crank arm is rotated by the shaft 21 which is passed into the metal housing 2.

Depending on the position of the busbar disconnector, the contact parts 35, 36 are brought into the assigned fixed contacts 28, 29. The dimensions of the individual parts of the driving mechanism 44 and their articulation points and angular positions are selected such that the positions which are possible with the busbar disconnector according to FIGS. 5 and 6 are achieved when the shaft 21 is rotated. Therefore, by rotating the shaft 21 in the clockwise direction, the first position (which can be seen in FIG. 8), in which only the busbar SS1 is connected to the busbar-side connecting link 26 of the power circuit-breaker 12, is firstly transferred to the second position, in which the two busbars are connected to one another, and then to the third position, in which only the busbar SS2 is connected to the power circuit-breaker 12.

A particular advantage of the design of the switching apparatus 1 with the busbar disconnector according to FIGS. 7 and 8 is that, by virtue of the opening and closing of the contacts in the axial direction, an arc produced during switching is axially aligned and does not tend to migrate to the wall of the metal housing 2.

The switching apparatus 1 according to the invention can advantageously be maintained and inspected as follows:

If the switching apparatus is intended for use in a high-voltage switching installation having a single busbar SS (switching apparatus according to FIG. 4), then the following method steps are to be carried out:

(1) opening of the power circuit-breaker 12
(2) isolation of the load outgoer (cable or line L) by opening the outgoer disconnector 18 and the disconnector of the remote station
(3) opening of the busbar disconnector 13
(4) isolation of the busbar SS in the installation
(5) actuation of the grounding switches 14 and 17
(6) manual grounding of the isolated busbar SS and of the isolated load outgoer by means of grounding rods
(7) short-circuiting of the current connections passed through the metal housing 2
(8) detachment of the connecting links to the busbar SS and to the load outgoer
(9) retraction of the switching apparatus 1.

If the switching apparatus is intended for use in a high-voltage switching installation having a double busbar SS1 and SS2 (switching apparatus according to FIG. 3), then the following method steps are to be carried out:

(1) opening of the power circuit-breaker 12
(2) isolation of the load outgoer (cable or line L) by opening an outgoer disconnector, which is provided inside or outside the metal housing 2, as well as the disconnector of the remote station
(3) opening of the busbar disconnector 13 by guiding the segment 24 into the fourth (neutral) position
(4) isolation of the busbar SS1
(5) actuation of the grounding switch 14 and of a grounding switch 17 which may additionally be provided
(6) manual grounding of the isolated busbar SS1 and of the isolated load outgoer by means of grounding rods
(7) short-circuiting of the current connections (which are passed through the metal housing 2) to the busbar SS1 and to the load outgoer
(8) detachment of the connecting links to the busbar SS1 and to the load outgoer
(9) cancelling of the grounding of the busbar SS1, as a result of which this busbar can be put into operation again and all of the loads can be switched from the busbar SS2 to the busbar SS1 (10) isolation of the busbar SS2
(11) manual grounding of the busbar SS2 by means of a grounding rod
(12) short-circuiting of the current connection (which is passed through the metal housing 2) to the busbar SS2
(13) detachment of the connecting link to the busbar SS2
(14) retraction of the switching apparatus 1.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A switching apparatus comprising:
   a grounded, insulating gas-filled housing, the housing having a housing wall;
   a power circuit-breaker disposed in the housing;
   a current connection for a first busbar;
   a current connection for a second busbar;
   a current connection for a load outgoer;
   a grounding switch disposed in the housing, the grounding switch being connected between the power circuit-breaker and the current connection for the load outgoer;

a busbar disconnector, the busbar disconnector being disposed in the housing connected between the current connection of the first busbar and the power circuit-breaker and between the current connection of the second busbar and the power circuit-breaker;

an outwardly extended, first tubular flange arrangement attached over a first opening in the housing wall;

an outwardly extended, second tubular flange arrangement attached over a second opening in the housing wall;

a first outdoor bushing, the first outdoor bushing being fastened to the first tubular flange attachment, the current connection for the first busbar extending through the first outdoor bushing;

a second outdoor bushing, the second outdoor bushing being fastened to the second tubular flange attachment, the current connection for the second busbar extending through the second outdoor bushing, wherein the busbar disconnector is movable between at least three positions, the busbar disconnector having a first and a second fixed contact and a movable contact arrangement the movable contact arrangement interacting with the first and second fixed contacts and being electrically conductively connected to the power circuit-breaker, the first fixed contact defining an end of the current connection of the first busbar and being disposed in the housing, and the second fixed contact defining an end of the current connection of the second busbar and being disposed in the housing.

2. The switching apparatus as claimed in claim 1, wherein the first outdoor bushing and the second outdoor bushing each have a fiber-reinforced synthetic resin having silicone shielding.

3. The switching apparatus as claimed in claim 1, wherein the movable contact arrangement is movable to a first position of the busbar disconnector in which the movable contact arrangement makes contact with the first fixed contact, and does not make contact with the second fixed contact, to a second position of the busbar disconnector in which the movable contact arrangement makes joint contact with the first fixed contact and the second fixed contact, and to a third position of the busbar disconnector in which the movable contact arrangement makes contact with the second fixed contact, and does not make contact with the first fixed contact.

4. The switching apparatus as claimed in claim 3, wherein the movable contact arrangement is movable to a fourth position of the busbar disconnector in which the movable contact makes contact neither with the first fixed contact nor the second.

5. The switching apparatus as claimed in claim 4, wherein the movable contact arrangement makes contact with a grounded current conductor in the fourth position of the busbar disconnector.

6. The switching apparatus as claimed in claim 3, wherein the movable contact arrangement rotatably mounted relative to the housing, and the apparatus further comprises a sliding contact that electrically conductively connects the movable contact arrangement and the power circuit-breaker.

7. The switching apparatus as claimed in claim 6, wherein the movable contact arrangement has a segment in the shape of a sector of a circle, the segment making contact with the first fixed contact, the first and second fixed contacts, and the second fixed contact when the movable contact is moved to the first, second and third positions of the busbar disconnector, respectively.

8. The switching apparatus as claimed in claim 6, wherein the movable contact arrangement is fastened to an end, situated inside of the housing, of a shaft, the shaft, extending out of the housing in a gastight manner, and the movable contact arrangement is mounted proximate the sliding contact.

9. The switching apparatus as claimed in claim 8, wherein the power circuit breaker includes a busbar-side current connection for electrically connecting the power circuit breaker to the movable contact arrangement, the apparatus further including an insulator held on the housing, the insulator supporting the busbar-side current connection.

10. The switching apparatus as claimed in claim 9, wherein the supporting insulator concentrically surrounds the shaft, the supporting insulator having an end remote from the housing, the supporting insulator having a holding part at the remote end of the supporting insulator, the holding part supporting the busbar-side current connection.

11. The switching apparatus as claimed in claim 3, wherein the movable contact arrangement includes a displaceably guided first contact part, the first contact part making contact with the first fixed contact when the movable contact is in the first and second positions of the busbar disconnector, and a displaceably guided second contact part, the second contact part making contact with the second fixed contact when the movable contact is in the second and third positions of the busbar disconnector.

12. The switching apparatus as claimed in claim 11, wherein the power circuit breaker includes a busbar-side current connection for electrically connecting the power circuit breaker to the movable contact arrangement, and at least one of the first and second contact parts is guided in a metal sleeve, the metal sleeve being at the potential of the busbar-side current connection.

13. The switching apparatus as claimed in claim 12, wherein a coupling rod is articulated to an end of the at least one of the first and second contact parts, the end being remote from the fixed contact, and the coupling rod is articulated to a crank arm of a crank which is actuated by a shaft.

14. The switching apparatus as claimed in claim 1, wherein the grounding switch is connected between the current connection of the load outgoer and the housing.

15. The switching apparatus as claimed in claim 14, wherein the power circuit breaker includes a busbar-side current connection for electrically connecting the power circuit breaker to the movable contact arrangement, and a further grounding switch is connected between the busbar-side current connection and the housing.

16. The switching apparatus as claimed in claim 1, wherein at least one outgoer disconnector is connected in the housing between the power circuit-breaker and the current connection for the load outgoer.

17. The switching apparatus as claimed in claim 1, wherein the power circuit breaker includes a busbar-side current connection for electrically connecting the power circuit breaker to the movable contact arrangement and a load-side current connection for electrically connecting the power circuit breaker to the current connection of the load outgoer, and the apparatus includes at least one of a voltage sensor and a current sensor arranged on at least one of the busbar-side current connection and the load-side current connection.

18. The switching apparatus as claimed in claim 17, wherein the apparatus includes at least one voltage sensor arranged on the outgoer-side current connection, and at least one voltage sensor arranged on the busbar-side current connection.

19. The switching apparatus as claimed in claim 17, wherein the apparatus includes at least one voltage sensor and the voltage sensor is a capacitively acting voltage sensor.

20. The switching apparatus as claimed in claim 17, wherein the apparatus includes at least one voltage sensor and the voltage sensor is an optically acting voltage sensor.

21. The switching apparatus as claimed in claim 17, wherein the apparatus includes at least one voltage sensor and the voltage sensor is an optically acting and a capacitively acting voltage sensor.

22. The switching apparatus as claimed in claim 17, wherein the apparatus includes at least one current sensor and the current sensor is in the form of a Rogovski coil.

23. The switching apparatus as claimed in claim 17, wherein the apparatus includes at least one current sensor and the current sensor is an optically acting current sensor.

24. The switching apparatus as claimed in claim 17, wherein the apparatus includes at least one current sensor and the current sensor is in the form of a Rogovski coil and is also an optically acting current sensor.

* * * * *